Jan. 12, 1965                H. G. HAUSSIG                3,165,268
METHOD AND APPARATUS FOR PROCESSING FERROUS SLAG
Filed Jan. 8, 1963                                    4 Sheets-Sheet 1
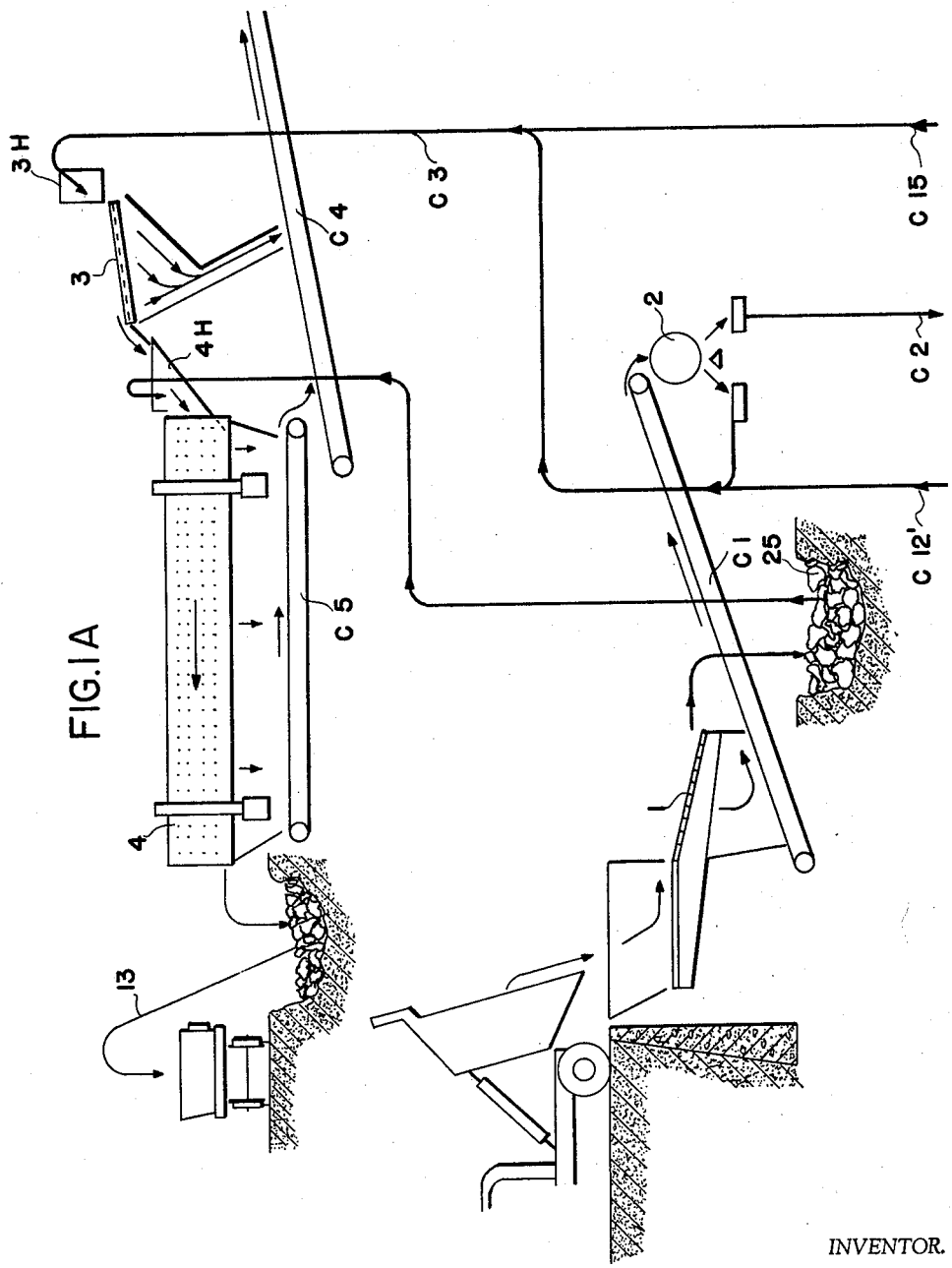
INVENTOR.
HERBERT G. HAUSSIG
BY

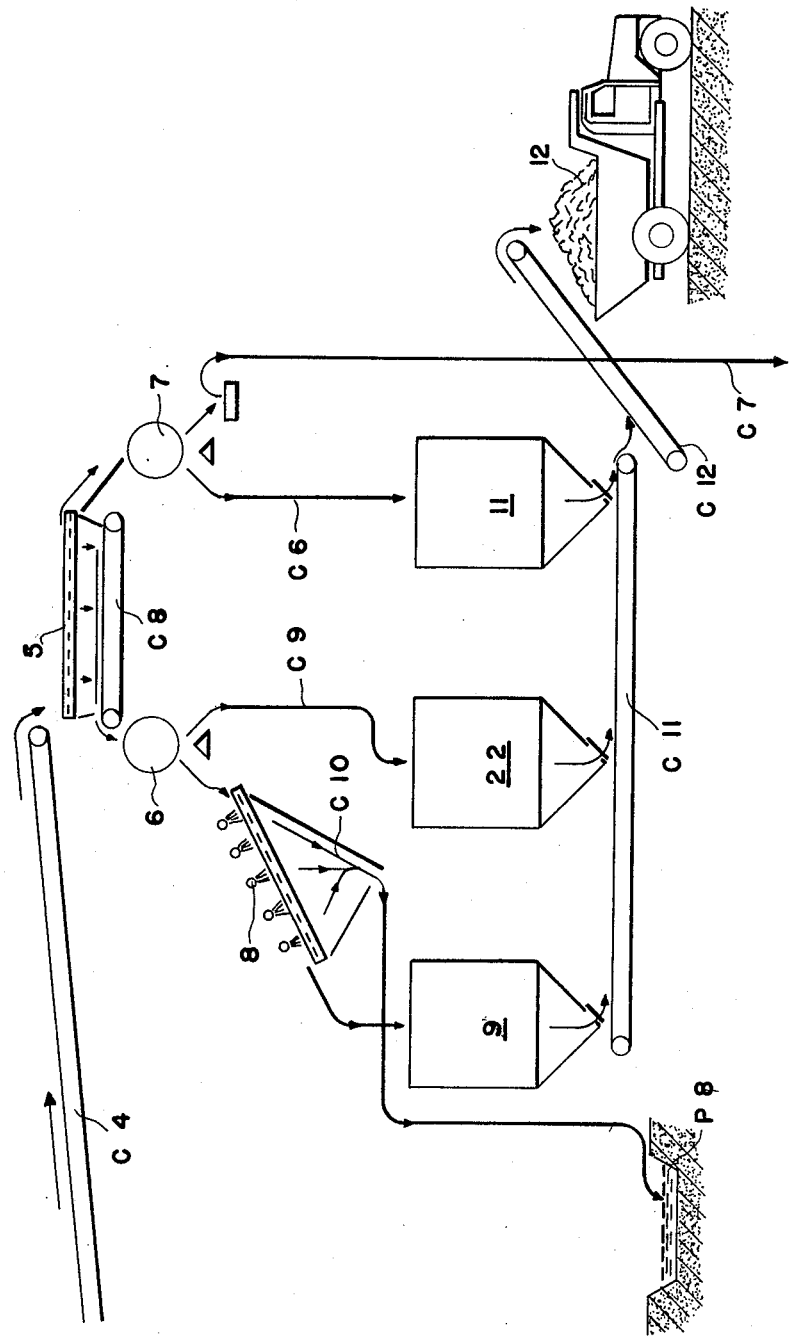

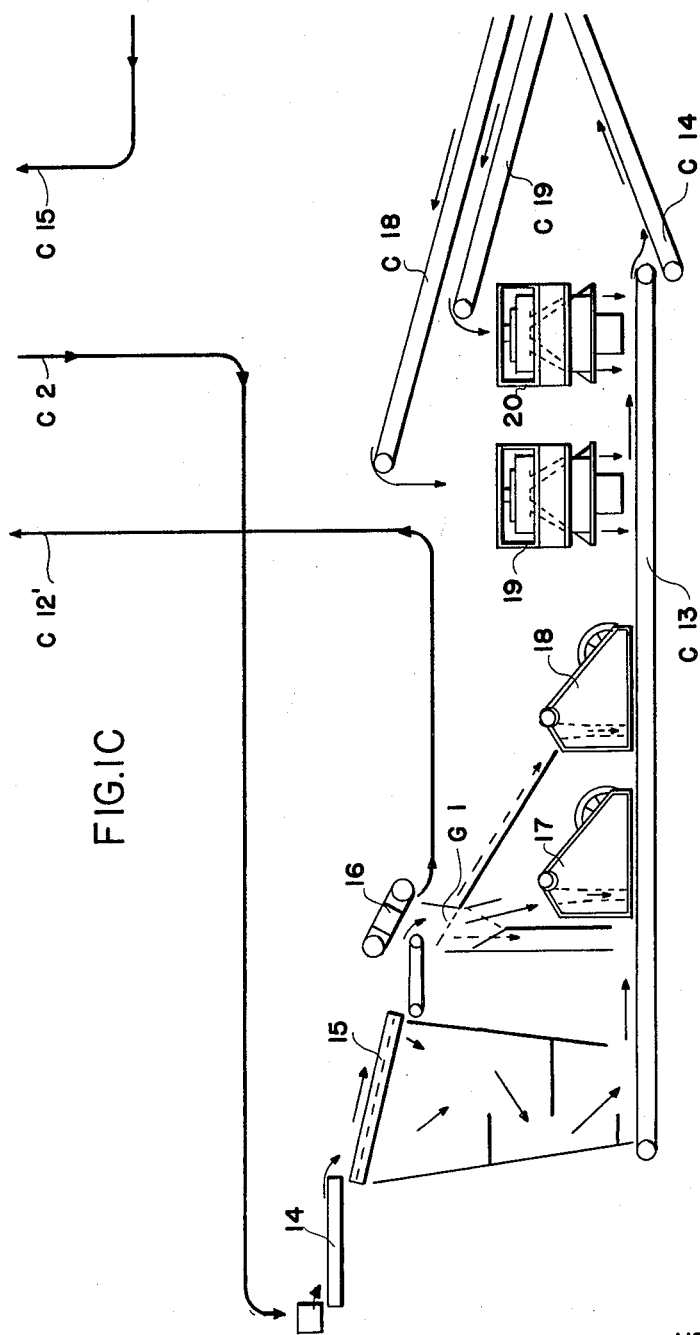

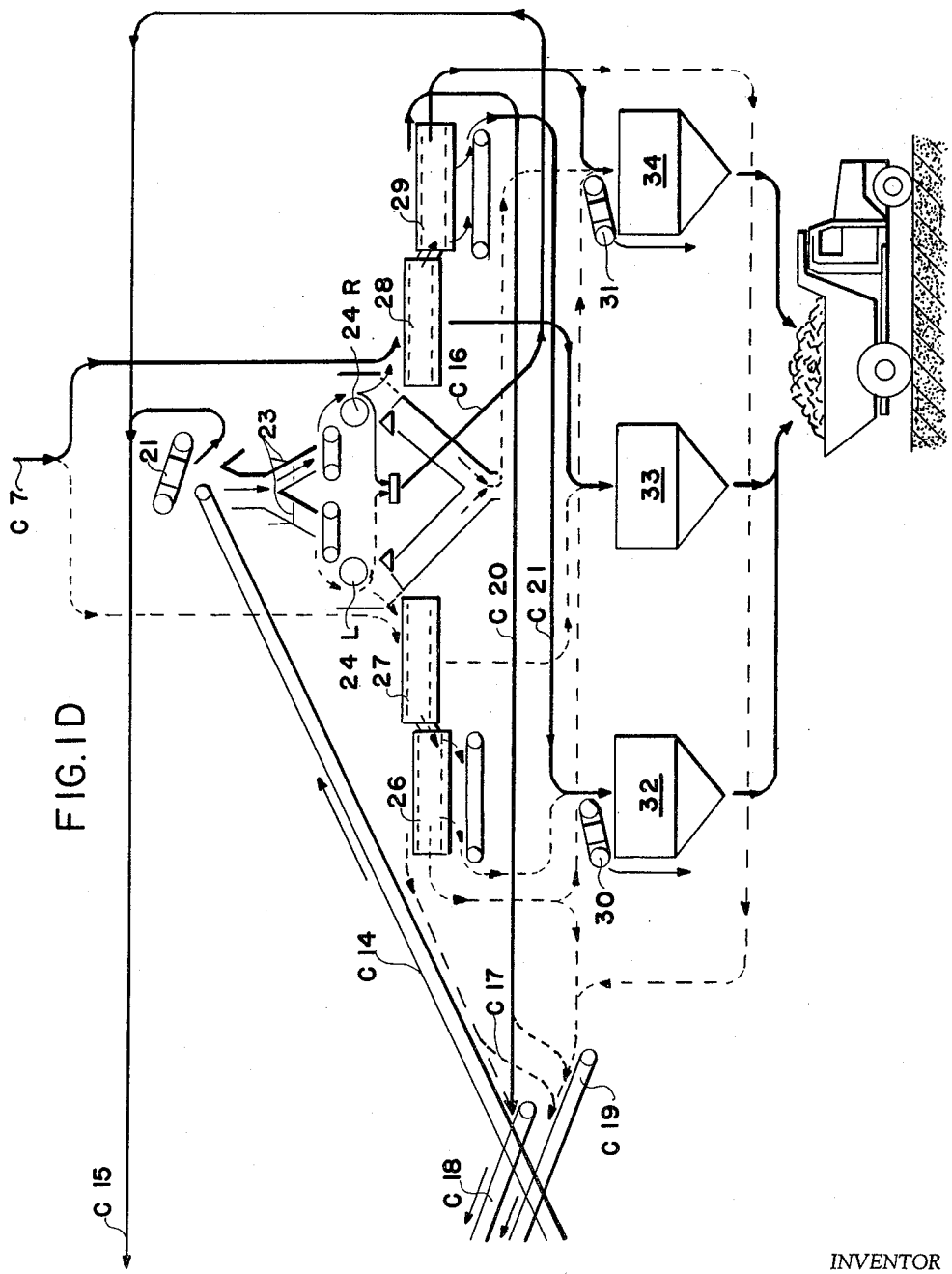

United States Patent Office 3,165,268
Patented Jan. 12, 1965

3,165,268
METHOD AND APPARATUS FOR PROCESSING
FERROUS SLAG
Herbert G. Haussig, Butler, Pa., assignor to Harsco Corporation, Harrisburg, Pa., a corporation of Delaware
Filed Jan. 8, 1963, Ser. No. 250,142
15 Claims. (Cl. 241—24)

The present invention relates to the art for the economical disposal of ferrous slag having the general objects of recovering a sufficient volume and value of reuseable metallics or scrap and a sufficient volume of other valuable end products to warrant special handling and processing of the waste slag of iron and steel making facilities. The present invention, both in its method and apparatus concept, can be primarily distinguished from the prior state of the art in that the method and plant thereof have much greater versatility in their applications, and in that the waste raw slag is subjected to more thorough processing to produce new end products which heretofore were not produced in any practical commercial volume. Further, as a consequence of this more thorough processing a higher proportion of the reuseable metallics is recovered from the raw materials, and the manner in which this further advantage is brought about will be described below.

A further object of the invention is the provision of a method and apparatus for accomplishing the results enumerated above which is of practical simplicity in over-all concept and of a character whereby the increased costs of the more intense processing is more than compensated for by the extension of products, and increase in metal scrap recovery, and also by an increase in the quality of the recovered scrap. These improvements result primarily from the concept of more thorough breaking up the raw slag to enhance the recovery therefrom of metal particles embedded in it while simultaneously producing a secondary raw material eminently suitable for a slag screening plant to produce end slag aggregate products in large volume, at low cost, and in a wide variety of size classifications capable of being tailored to the commercial demands of the particular area in which the slag processing plant of the invention is located.

Heretofore, in the general prior art, and particularly in industry, the tendency has been to treat iron making or blast furnace slag entirely separate from steel-making or primarily openhearth slag, necessitating duplicate facilities and extra space for operations. Blast furnace slag is commonly processed for road-building and other construction aggregates while the principal function of steel-making slag processing has been to recover the reuseable metallics therefrom. With this arrangement it is uneconomic to add cleaning and screening facilities to the plant for processing steel-making slag for the production of structural aggregates, and accordingly some valuable by-products are lost. Recently, it has been determined that certain size classifications of the less friable components of steel-making slag if properly cleaned and thoroughly freed of metallics have a number of beneficial uses. For example, this material is well suited for making dense high-strength structural or concrete blocks and for imparting a non-skid surface to a blacktop highway. The versatility of my method and plant enables such an end product to be selectively produced while the method and plant is instantly available and useful for the production of clean blast furnace slag of varying desired size classifications. Further, regardless of the type of slag being processed at any particular time the flow of the raw material with respect to the mechanical apparatus in the plan is such that substantially all of the reuseable metallics is recovered therefrom to provide not only a valuable product in this recovered scrap but also to produce aggregate products remarkably free of metal. The latter is particularly important because if metal objects remain in any aggregate which is to be used for road surfacing the same will severely damage rubber tires on the vehicles using the road and, further, the subsequent oxidation of the metallics causes discoloration and disintegration of other products utilizing the aggregate.

A more specific but important aspect of the invention is the provision of a material flow arrangement and a related crushing plant which after a number of pireliminary size classifications and magnetic separations is operative to break down the larger size pieces of slag which are low in metal content into smaller pieces for the purpose (a) of facilitating the withdrawal of further metal from the bulk maerial and (b) producing an end product aggregate of the desired particle sizes. The raw slag refuse from iron and steel-making operations contains an appreciable amount of discrete pieces of plus 3" minus 12" size, for example, which may contain deeply embedded metal pieces and even though these metal pieces are of substantial weight the encrusting slag will keep them too far removed from the attracting surfaces of efficient magnetic separators to attract them out of the bulk material. By reducing the size of these pieces it will be understood that the next succeeding magnetic separation will be more efficient in cleaning out the metal.

The above and other objects and advantages of the invention will become apparent upon consideration of the following specification and the accompanying drawing wherein there is disclosed a preferred embodiment of the invention.

The sole figure of the drawing, on four sheets, is a schematic showing of a representative plant utilizing the principles of my invention, the illustration being separated into four sections as follows:
 (A) Primary separation and cleaning.
 (B) Refining section.
 (C) Primary and secondary crushing section; and
 (D) Screening section.

As shown in drawing section A, the raw slag material as received from the blast furnace or steel mill is loaded through a hopper onto a grizzly 1 having 12" openings by means of a vibratory feeder which serves to control the rate of feed to the entire plant. The oversize rejects are dropped into a breaking pit 25 in which, in accordance with usual practice, they are broken up with a drop ball or by lancing with oxygen, if necessary, after which the larger pieces of csrap are lifted by a magnet crane and deposited in the feed hopper 4H of a continuous flow tumbler barrel 4. The latter is formed of heavy flat side plates having apertures of the order of 3" in diameter and it will be understood that as the larger size scrap progresses through this barrel that they will be cleaned of their encrusting slag. The resulting dust, grit, and smaller particles of slag and scrap up to 3" size will pass out through the apertures in the side wall of the barrel while all pieces above 3" will be discharged at the exit end of the barrel for re-travel back to an open hearth furnace.

The materials passing through the grizzly 1 are deposited on a conveyor C1 for deposition on electro-magnetic drum 2 from which the non metallic faction is conveyed by conveyor C2 to the crushing plant C while the metal-bearing fraction is conveyed by conveyor C3 to a feed hoper 3H of a "3" vibrating screen 3. The oversized rejects from the screen 3 pass into the hopper 4H while the minus 3" scrap is funneled onto a conveyor C4 which leads to the refining section B of the plant installation. It should also be noted that the conveyor C4 is also fed by a conveyor C5 which gathers the minus 3" particles which pass outwardly through the apertures in the side wall of the tumbler barrel 4. The non-metallic debris remaining in the pit 25 may be lifted by a clam shell bucket and deposited back onto the grizzly 1 for disposal through the path provided by section C.

All the materials furnished the refining section B by the conveyor C4 are deposited on a vibrating screen 5 having a mesh of ½", for example, and the larger sized rejects from this screen are deposited onto magnetic separating drum 7 from which the metallics are conveyed by conveyor C6 into the storage bin 11 while the non metallic fraction is conveyed by conveyor C7 to the screening section D. The smaller particles which pass through screen 5 are collected on a conveyor belt C8 and deposited onto the magnetic separating drum 6 from which the non-magnetic fraction is carried by conveyor C9 into a tailings bin 22. The metallic fraction from separating drum 6 is deposited onto an extremely fine (⅛" mesh) wet vibrating screen 8 from which the rejects are conveyed into the metallics bin 9. The smaller particles which pass through screen 8 are collected onto a conveyor C10 which leads to a slurry pond P8. The settlement in pond P8 may be mined from time to time and the sludge dried and briqueted or other use made of these fines.

Bins 9, 11 and 22 are each provided with a gated discharge hopper for the selective removal of contents onto a conveyor C11. This latter discharges onto an elevating conveyor C12 for loading onto trucks (12) or other equipment used to dispose of the tailings and to carry the metallics back to a blast furnace or cupola.

From the above description of sections A and B of the complete slag processing installation of my invention it will be obvious that practically all of the recoverable metallics and all of the slag dust and fines will be separated from the raw slag before the predominantly slag fraction (plugs ½" minus 3" tailings) is fed to the slag screening section D. While a substantial amount of dust and fines will enter the crushing section C by means of conveyor C2 it will be apparent later that this material is subjected to an initial screening in section C to avoid overloading or clogging of the crushers, enabling the latter to operate at maximum efficiency. As will also appear later the materials fed by conveyor C2 are subjected to a final magnetic separation before entering the crushers, the metallics being added to the flow in conveyor C3 by a conveyor C12'. Thus, it will be apparent that plant sections A and B may be considered as the metal scrap producing sections—section A for openhearth scrap and section B for blast furnace or cupola additives. The vibratory screen 5 operates not only to provide size separation but to some extent acts to separate pieces which may be only lightly adhered to each other. Consequently the burden coming onto magnetic drum 7 is fairly free of loose contaminating particles so that by properly adjusting the magnetic intensity of the drum an efficient magnetic separation is effected to render the tailings going onto the conveyor C7 substantially free of metallics and the recovered scrap in bin 11 of high quality. The magnetic intensity of drum 6 is likewise adjusted to the particle size of the burden coming onto it so that the metal particles coming into the bin 9 constitute most of the recoverable metal particles and are of acceptacle Fe concentration.

In furtherance of the over-all objectives of the assembled plant herein disclosed I provide, in the crushing section of the assembly, a jaw crusher 17 which is normally set to reduce all materials to minus 3" size and a second jaw crusher 18 which is normally set to reduce all materials to minus 5" size. The purpose of this arrangement is to provide flexibility in the slag aggregate output of the plant in relation to the commercial demand for slag aggregate of specific size designation. Suitable diverting gates, indicated generally by reference numeral G1 are provided to selectively direct the burden coming into the crushing section to either one or both of the crushers 17 and 18, or to none of them—depending on the particular program to be followed. In actual practice the directing gates G1, as well as various other bypasses and selectors to be hereinafter described, will be remotely controlled from a centrally disposed control room or pulpit to allow the over-all operation of the plant to be tailored to the character of the raw slag and refuse being processed and to the demands for certain specified end products of the plant.

The minus 12" predominently slag burden coming from magnetic separator 2 along conveyor C2 is fed onto a combined vibrating feeder and picking station 14 where the flow of the burden is controlled and where such reuseable materials, such as refractory brick, may be gleaned from the flow. From feeder 14 this flow is deposited on an inclined vibrating screen 15 of 3" mesh to remove all particles which are less in dimension than the setting of the crusher 17. The minus 3" size fraction passing through screen 15 falls downwardly onto a conveyor C13 which is also a common carry-away facility for the crushers 17 and 18.

The plus 3" minus 12" overs from the screen 15 are passed under a belt-type of magnetic separator or gleaner 16 before passing onto the directing gates G1. The series combination of the magnetic separator 2, the picking station 14, vibrating screen 15 and second magnetic separator 16 enables the plant to be operated with a substantial freedom of large metal pieces going into the crushers. The metallics separated out by magnet 16 are automatically loaded onto a conveyor C12' which joins with conveyor C3 to deposit the metal scrap onto the vibrating screen 3.

All the slag and refuse burden passing through the crushing section C and collected on conveyor C13 is deposited onto an elevating conveyor C14 at the discharge end of which this burden is again magnetically gleaned by a belt-type of separator 21. The gleaned metallics are positioned on conveyor C15 for transfer back to the vibrating screen 3 and thence to conveyor C4 to recovery section B. The non-magnetic materials passed by magnet 21 falls into a vertically disposed conduit having a pair of divergent outlets selectively controlled by gates 23. Again, these gates are preferably remotely controlled from a central control point, and the purpose of the diverting arrangement is to provide wide flexibility in the size classifications of the aggregate end products as will appear more fully hereinafter. From one of the divergent gates the burden passes over a magnetic separating drum 24L while a similar separator 24R is provided for the outlet of the other diverting gate. The metallics recovered are collected on conveyor C16 which leads to conveyor C15, and the non-metallics are either collected directly into a storage bin 34 but more commonly are passed onto vibrating screens for size classification. Thus, from separators 24L the non-magnetic fraction is deposited onto the top screen of a double vibrating screen 27 which may, for example, have ⅜" openings while the lower screen thereof is of 4 mesh. Adjacent the double vibrating screen 27 is a similar unit 26 having an upper screen with 1½" openings, for example, to receive the overs from the top screen of the unit 27 and arranged to receive on its bottom screen of ⅜" openings, for example, the overs from the bottom screen of unit 27. It will therefore be understood that this arrangement enables end products of two size classifications to be simultaneously produced—one of minus 4 mesh which goes into bin 33 and the other of minus ⅜" plus 4 mesh which goes into bin 32. The overs from top screen of unit 26 may, by means of controlled conveyors indicated generally by reference numeral C17 be diverted back to the crushing section C wherein two cone-type crushers are provided to receive this burden. One of these latter crushers is shown schematically at 19, being fed by an elevating conveyor C18 while the other crusher is shown at 20 being fed by conveyor C19. The units 19 and 20 are preferably of different capacities and, in practice, are set for different size end products to lend maximum flexibility to the plant. The crushers 19 and 20 are of the kind in which a cone-shaped mandrel gyrates within a conical anvil and thus are capable of continuous processing of large quantities of materials.

The non-magnetic fraction coming off separator 24R is deposited on the upper screen of a double vibrating screen 28 which unit may have, for example, a top screen of 1″ openings and a bottom screen of 4 mesh. The double throughs are collected into bin 33 while the overs from the top screen are fed onto the top screen of a double vibrating screen 29. The top screen of unit 29 may have an opening size of 1½″ while the bottom screen has an opening size of 1″. The overs from the top screen are fed through conveyor C20 to the control conveyor C17 while the 1″ x 1½″ fraction is deposited in storage bin 34. The 4 mesh by 1″ fraction from unit 29 is conveyed to bin 32 by the conveyor C21. In this illustrated arrangement the bin 32 will, of course, contain particles from 4 mesh to 1″ size while the bin 34 will contain particles between 1″ and 1½″ in size. Since these materials are commonly sold for end uses in which free metal is undesirable, magnetic belt separators 30 and 31 are used to further extract any free metal as the burden flows into the bins 32 and 34, respectively.

As shown in the drawing, the plus ½″ minus 3″ tailings moving on conveyor C7 are deposited directly onto either one or both of the screens 27 and 28. After selective size extraction the larger pieces pass over the top screens of units 26 and 29 and thence to the crushers. The material passing over the tops of the lower screens of units 26 and 29 may, if desired, be also conveyed back to the crushers if finer crushing is required in meeting the specific dimensions for certain end product sizes.

It should be observed that by closing off one or the other of the selector gates 23 the size separation will be more selective in the sense that the range of sizes in the storage bin 34 will be smaller—i.e. either ⅜″ x 1½″ or 1″ x 1½″. The same also holds true for bin 32 where the maximum size will be either ⅜″ or 1″. This and the possibility of selective crushing gives the installation the ability to produce the largest possible amount of a required product size with the least possible amount of material to be stored for future use or to be wasted. As stated initially above, the crushers have the further function of liberating any metal enclosures in the size 1½″ to 3″ pieces whereby such liberated metal may be separated out by the magnets 21 and 24 and conveyed to the cleaning and recovery section B. The magnets 30 and 31 have the further function of extracting magnetic slags which are an ordinarily undesirable inclusion in the screened and sized slag received in the bins 32 and 34.

The double vibrating screens 26–29 are commercial units readily available in the market, and it is well known in the art that such units are commonly constructed for ease of interchanging the screens to different mesh. I contemplate that this fact will be fully utilized in the operation of the plant herein disclosed. For example, if slag of the range of 1½″ to 2″ is desired as an end product the illustrated top screen of unit 29 may be moved to the bottom and a new top screen of 2″ mesh inserted. The product then entrapped between the two screens will be conveyed to bin 34.

It should now be apparent that I have provided an improved plant assembly for processing blast furnace and steel mill slag and refuse which accomplishes the objects initially set out. The plant is very efficient in operation regardless of whether the slag component of the incoming raw material is predominantly from steel-making operations or from a blast furnace. In connection with the latter most of the burden will find its way to the jaw crushers 17 and 18 and thence directly to the sizing and cleaning station D for efficient disposal. However, any tramp iron will be recovered by the various magnetic separators dispersed throughout this section, and the highly efficient cone-type of crushers 19, 20 will provide ample stock to supply large demands for the more commonly used size classifications of blast furnace slag. Nevertheless, the plant installation remains highly efficient in processing steel-making slag and refuse where a greater yield of reuseable metal scrap is to be expected. The combination of the tumbler barrel 4 for cleaning the larger pieces of scrap and for breaking down the larger pieces of slag and refuse which may contain entrapped metal with the crushers for liberating metal pieces entrapped in other larger pieces of slag and refuse provides a most efficient and economical method for processing these waste steel-making materials. In this connection it should be noted that the larger pieces of metal scrap fall out of the tumbler barrel 4 into a pit from which they may be removed by any suitable magnetic means, designated schematically at 13, for conveyance back to the openhearth, electric furnace, cupola, etc. The smaller metallics are concentrated in the bins 9 and 11 and thus are kept separate from the slag cleaning and screening section.

By providing the equipment in the arrangement shown herein, and particularly the various remotely controllable gates and divertors it is possible to very quickly adapt the plant to the nature of the raw materials being fed into it and to switch from one product to the other on short notice. Further, it is possible to produce the highest amount of salable end products possible from the incoming raw materials with the practical degree of material working and handling and with the lowest amount of non salable product to be stored or wasted. The refining of the end products as well as the degree of iron extraction may be selectively varied as desired to meet the conditions of the incoming burden and the demanded characteristics of the end products. Thus, new end products are entirely possible as, for example, tough, abrasive, and granulated openhearth finishing slag meticulously free of metal piece inclusions and thus suitable for antiskid roadway coatings. When dealing primarily with blast furnace slag aggregates it is possible to emphasize one or the other end product slag classification by switching from one cone crusher to the other, these being preset for different size products.

Having thus described my invention, what I claim is:

1. A plant installation for the processing of ferrous slags and refuse resulting from iron or steel making operations to recover metal scrap therefrom and to produce slag aggregate end products of predetermined size classifications and substantially free of included metal comprising a primary magnetic separator to divide incoming raw materials of handleable particle size into a first fraction rich in iron and into a second fraction predominantly nonmetallic but in which metal pieces may be embedded in discrete pieces of slag, means to clean and separate into predetermined size classifications the metal pieces of the first fraction, means to reduce the larger sized pieces of the second fraction to a predetermined maximum size to thereby release metal pieces contained therein and to provide a burden for a slag screening plant, means to magnetically separate the released metal pieces out of said burden, and means in said screening plant to thereafter divide the reduced slag into predetermined size classifications.

2. A plant installation for the recovery of metal scrap from ferrous slags and refuse resulting from iron or steel making operations and for the simultaneous production of substantially metal-free and size classified slag aggregate comprising in combination a primary magnetic separator and primary means to clean and classify as to size the metal pieces cleaned by said primary separator, means for crushing the burden passed by said primary separator, a secondary magnetic separator for gleaning metal pieces out of said crushed burden, and vibrating screen means for removing dust and fines from said crushed burden and to divide the same into predetermined size classifications to thus produce structural slag aggregate.

3. Apparatus according to claim 2 further including a second crushing means, a conveyor for moving the oversized rejects from said vibrating screen means to said second crushing means, and conveying means to return the output of said second crushing means to the inlet of said vibrating screen means.

4. Apparatus according to claim 2 further including a vibrating feeder and an adjacent inclined vibrating screen to convey the burden passed by said primary separator to said means for crushing, and means for adding the throughs from said inclined screen to said crushed burden.

5. Apparatus according to claim 4 further including a third magnetic separator acting on the overs from said inclined screen to further glean metal from the burden passed by said primary separator before said burden passes to said means for crushing.

6. Apparatus according to claim 3 further including means to extract fines and all pieces smaller than a predetermined size from the burden passed by said primary separator before said burden passes to said first mentioned means for crushing, said first mentioned means for crushing being a power driven jaw-type of crusher, and means for adding the throughs from said extractor to said crushed burden.

7. Apparatus according ot claim 6 further characterized in that said second crushing means is a power operated cone-type of crusher, and said conveying means being operative to gather the throughs from said extractor and the outputs of both said crushing means.

8. In a plant installation for preparing graded slag aggregate from iron or steel making slag refuse from which most of the tramp magnetic materials have been separated comprising in combination and in sequence means to effect an initial vibration and size separation of the incoming burden, means to further remove tramp magnetic materials from the larger sized fraction of said burden and to thereafter crush said fraction down to a maximum particle size substantially equal to the maximum particle size of the smaller sized fraction of said burden, means to convey both said fractions to a sizing and cleaning station, and said station having a plurality of vibrating screens to separate out dust and fines from said combined fractions and to divide said fractions into predetermined size classifications to thus produce structural slag aggregate.

9. In a plan installation for processing slag and other solid refuse resulting from iron or steel making operations to recover metal scrap and to produce sized structural aggregate substantially free from iron and steel inclusions, a first separating station to remove free iron and steel pieces from the incoming raw burden, a primary crushing station to receive the predominantly nonmagnetic fraction from said first separating station to reduce all pieces of said fraction to a predetermined size to thus liberate further magnetic pieces and to provide materials for an aggregate cleaning and sizing station, a second separating station having means to receive the output of said primary crushing station and to remove from said output the released magnetic pieces therein, said cleaning and sizing station having means to reject all pieces passing through said primary crushing station which are beyond a predetermined particle size, a secondary crushing station having means to receive the oversized rejects from said sizing station, and means to convey the output of said secondary crushing station to said second separating station.

10. In a plant installation for processing slag and other solid refuse resulting from iron or steel making operations to recover metal scrap and to produce sized structural aggregate substantially free from iron and steel inclusions, a first separating station to remove free iron and steel pieces from the incoming raw burden, means to clean and separate into size classifications the iron and steel pieces removed from said burden, a primary crushing station to receive the predominantly nonmagnetic fraction from said first separating station to reduce all pieces of said fraction to a predetermined size to thus liberate further magnetic pieces and to provide materials for an aggregate cleaning and sizing station, a second separating station having means to receive the output of said primary crushing station and to remove from said output the released magnetic pieces therein, said cleaning and sizing station having means to reject all pieces passing through said primary crushing station which are beyond a predetermined particle size, a secondary crushing station having means to receive the oversized rejects from said sizing station, means to convey the output of said secondary crushing station to said second operating station, said sizing station having a pair of parallel paths one of which produces an end product of clean aggregate having one range of particle size while the other path produces an end product of clean aggregate having a second range of particle size, and controlled conveyor means for directing the flow of the overs from said second separating station into one or the other of said paths.

11. A plant installation for the processing of ferrous slags and refuse resulting from iron or steel making operations to recover metal scrap therefrom and to produce slag aggregate end products of predetermined size classifications and substantially free of included metal comprising a primary magnetic separator to divide incoming raw materials of handleable particle size into a first fraction rich in iron and into a second fraction predominantly nonmetallic but in which metal pieces may be embedded in discrete pieces of slag, means to clean and separate into predetermined size classifications the metal pieces of the first fraction, a horizontally disposed belt conveyor, an incline vibrating screen positioned above one end portion of said conveyor and arranged to receive the materials of said second fraction whereby the smaller sized pieces thereof are deposited onto said conveyor, a crusher having its outlet positioned over said conveyor and having an inlet arranged to receive the overs from said screen, a magnetic separating and size classifying assembly arranged to receive the materials coming off said conveyor to glean magnetic materials therefrom and to produce slag aggregate of predetermined size classifications, a second crusher having its outlet positioned over said conveyor, and means to move the outsized overs from said assembly to the inlet of said second crusher.

12. A plant installation for the processing of ferrous slags and refuse resulting from iron or steel making operations to recover metal scrap therefrom and to produce slag aggregate end products of predetermined size classifications and substantially free of included metal comprising a primary magnetic separator to divide incoming raw materials of handleable particle size into a first fraction rich in iron and into a second fraction predominantly nonmetallic but in which metal pieces may be embedded in discrete pieces of slag, means to clean and separate into predetermined size classifications the metal pieces of the first fraction, a plurality of crushers having different settings to provide a crushed burden of selected maximum size, means to move said second fraction to at least one of said crushers, an assembly to receive materials from said crushers and operative to first remove magnetic particles and pieces therefrom and to thereafter divide said materials into predetermined size classifications, and means to move the outsized rejects from said assembly to a selected one of said crushers.

13. Apparatus according to claim 12 further characterized in that said assembly includes parallel apparatus to provide two separate paths of material flow in the sizing section whereby end products of different size classifications may be produced, and control means for directing materials into one or the other of said paths.

14. The method of processing slag and other solid refuse resulting from iron or steel making operations to recover metallic scrap therefrom and to simultaneously produce cleaned and sized structural aggregate substantially free of iron and steel inclusions which consists of first removing from the incoming raw material burden all particles and pieces which are predominantly magnetic, cleaning such removed magnetic particles and pieces to provide scrap having a predetermined iron content, crushing the predominantly nonmagnetic fraction of said burden to release additional magnetic iron and steel particles and pieces which may be embedded therein, removing such released magnetic particles and pieces from the crushed burden, and thereafter cleaning and separating the tailings into structural aggregate of predetermined size classifications.

15. The method of claim 14 including the further step of crushing the larger sized particles of the predominantly nonmagnetic fraction of said crushed burden to provide an additional supply of smaller sized aggregate.

References Cited in the file of this patent

UNITED STATES PATENTS

| | | |
|---|---|---|
| 2,990,124 | Cavanagh | June 27, 1961 |
| 3,049,305 | Rath | Aug. 14, 1962 |
| 3,081,954 | Heckett | Mar. 19, 1963 |